United States Patent
Haldimann

[11] Patent Number: 5,915,516
[45] Date of Patent: Jun. 29, 1999

[54] PUSH BACK STORAGE ASSEMBLY

[75] Inventor: Hans-Rudolf Haldimann, Lugano, Switzerland

[73] Assignee: Gilgen Fordersysteme AG, Oberwangen, Switzerland

[21] Appl. No.: 08/849,648

[22] PCT Filed: Oct. 7, 1996

[86] PCT No.: PCT/CH96/00353

§ 371 Date: May 29, 1997

§ 102(e) Date: May 29, 1997

[87] PCT Pub. No.: WO97/13711

PCT Pub. Date: Apr. 17, 1997

[30] Foreign Application Priority Data

Oct. 9, 1995 [CH] Switzerland ............................ 2835/95

[51] Int. Cl.⁶ .................................................. B65G 11/00
[52] U.S. Cl. .................................................. 193/40
[58] Field of Search ................................... 193/35 A, 38, 193/40, 37; 414/267, 276, 286

[56] References Cited

U.S. PATENT DOCUMENTS

| 4,212,381 | 7/1980 | Cook | 193/40 |
| 4,238,022 | 12/1980 | Williams | 193/40 X |
| 5,538,384 | 7/1996 | Zimmermann | 414/286 |
| 5,567,103 | 10/1996 | Konstant | 193/40 X |

FOREIGN PATENT DOCUMENTS 1889789  3/1964  Germany .

*Primary Examiner*—James R. Bidwell
*Attorney, Agent, or Firm*—Tarolli, Sundheim, Covell, Tummino & Szabo

[57] ABSTRACT

A tunnel stand bearing arrangement includes a plurality of shelf channels. Each shelf channel is provided with a circulating conveyor, on which the goods to be stored are received in a frictional manner. Each shelf channel is provided with a stationary slide member located in its end region where the goods are unloaded. The slide member has an active length corresponding to 0.8 to 1.2 times the mean brakeless run-out distance of the conveyor set in motion by the removal of goods. The conveyor is designed such that the non-positive frictional coupling between the conveyor and the goods stored thereon is released in front of the active portion of the slide member.

10 Claims, 3 Drawing Sheets

PUSH BACK STORAGE ASSEMBLY

The present invention refers to a tunnel stand bearing arrangement.

Tunnel stand bearing arrangements of the kind referred to herein above are useful for receiving and storing a plurality of goods which are loaded consecutively into the particular shelf channels of the storage assembly, whereby the shelf channels are designed in the kind of tunnels.

As conveyor means for the goods to be stored, usually received on pallets, one may use chain conveyors which are mounted in all the shelf channels. Such a chain conveyor is disclosed, for example, in the publication WO 94/00370. In this particular chain conveyor, a conveying chain equipped with a plurality of rollers is used as the real conveying member. Both ends of that conveyor chain are connected to each other to form thereby an endless loop which may be moved along the longitudinal extension of the particular shelf channel. During the loading operation, a pallet is laid onto the conveyor chain and pushed into the shelf channel by means of a suitable vehicle, e.g. a fork lift truck. During the unloading operation, the pallets are removed from the shelf channel at the same side thereof, again by means of e.g. a fork lift truck.

One difficulty observed in connection with such chain conveyors may be seen in the challenge that the rolling friction of the chain running along a supporting rail must be kept as low as possible, since a particular shelf channel may receive up to twenty pallets and since not only the individual pallet to be removed from and loaded into the shelf channel, respectively, has to be moved during the unloading and loading operation, respectively, but in each case the entire mass present in the shelf channel. Such moving operation must be performed as quickly as possible.

Moreover, the total mass of goods, which can amount up to 20-times the mass of an individual pallet, has to be slowed down within quite a short time after it has been displaced. In most cases, it is essential that such deceleration must be performed without shocks and reliably within the overall stopping distance allowed by the geometry of the shelf channel. This can be realized such that the backward rolling fork lift trucks after having pulled a pallet out of the shelf channel, stops the row of pallets remaining in the shelf channel at the desired position. However, such an operation is strictly dependent of the skill of the driver of the fork lift truck. If the driver does not decelerate enough the moving pallet row, there is a risk that the pallets overrun the end of the shelf channel whereby the front most pallet falls out of the shelf channel.

The same problems may be observed not only in connection with shelf channels equipped with chain conveyors, but also in connection with shelf channels of a tunnel stand bearing arrangement provided with different kinds of conveying systems, e.g. roller conveyors whose rollers are interconnected by chains, or trolleys coupled to each other.

In order to find a solution for these problems, a great number of stop and braking systems for continuous shelf storage assemblies has been disclosed in the prior art; this fact may be an evidence that the afore mentioned problem really has not been solved satisfactorily up to now. For example, in the publication mentioned herein before, claim 35 discloses such a stop member which has, however, the disadvantages discussed herein after.

For stopping rows of pallets which may have widely varying total masses at a predetermined standstill point, it would be necessary to positively affix a mass-independent path-velocity-curve to the moving total mass. This could be realized with the help of controlled braking motors; however, this would be much too lavish and costly, because each shelf channel had to be equipped with such a braking system.

Instead, as an obvious and commercially reasonable solution, elastically deformeable buffer members are used in most cases. These buffer members, however, perfectly fit in each case a predetermined mass, but show a more or less disadvantageous behavior when the mass is lower or higher than that predetermined mass. On the other side, the removing velocity is predictable within quite narrow limits due to the known characteristics of the vehicle used for this purpose.

Simple rough estimates for the bandwidth of the required work consumption for the total mass of the goods present in a shelf channel show a relation of 1 to 400. The reason therefore is that not only the number of pallets present in a shelf channel, but also their particular gross weight may be very different from case to case. Thus, even overrun brake means equipped with friction linings and/or friction rollers cannot meet the requirements; such means are based on wrong and not predictable, respectively, physical assumptions.

If the braking systems are not sufficient, the unloading time required for one pallet is increased in the same degree as the transfer performance per time unit is decreased. Moreover, overrun brake means and elastically deformeable buffers have the disadvantage, common to all systems disclosed in the art up to now, that the provision thereof in the shelf channel consumes a valuable portion of the usable length of the shelf channel that is not available e.g. in the case of the modification of an existing tunnel stand bearing arrangement. Thus, in each shelf channel, one pallet storage space would be lost.

It is therefore an object of the invention to improve a tunnel stand bearing arrangement in such a way that the conveying means put into motion by the unloading operation of goods gently and reliably comes to a standstill, independently of the mass put thereon, that any danger is avoided that goods received in the shelf channel overrun the end thereof and may fall out of the shelf channel, even if the operator removing goods from the shelf channel is not very skilled, and that the length of the shelf channel may be used for the storage of goods as completely as possible, all this without involving commercially intolerable high costs.

Thus, the invention assumes that the particular conveyor and the conveying member, respectively, is mounted horizontally and that the goods are received on pallets. During the removal of the pallet from the shelf channel, a non-positive frictional connection between pallet and conveying member is present as long as the pallet to be removed is completely pulled away from the conveying member. Thereby, the conveying member and, therewith, all pallets remaining thereon are simultaneously moved towards the unloading end of the shelf channel when the front most pallet is pulled out.

For moving the conveying member, a tractive force is required which is equal to the sum of all frictional forces occurring in the conveyor, for instance the frictional forces of a roller chain moving along a supporting rail. This tractive force can be calculated using the coefficient of friction, that is quite low and constant within narrow limits due to the inherent design of a roller chain which may be equipped with roller bearings, multiplied by the total weight of the pallets that is not known and may vary within wide limits. The coefficient of friction cannot fall short of a physical minimal value. Would it be zero, —that would be equal to a perpetuum mobile—, the shelf channel had to be arranged not horizontally, but with a gradient of 1% toward the unloading end.

As soon as the tractive force is removed, the conveying member with the pallets loaded thereon slows down and is decelerated along a certain distance. The deceleration distance can be calculated as the speed-dependent kinetic energy divided by the consumption of work per distance unit. Both in the dividend and the divisor of the applicable formula, the same, varying and in the particular case unknown mass is contained and, thus, can be canceled. Arithmetically, this can be illustrated as follows:

From the formula $$\tfrac{1}{2} \cdot M \cdot v^2 = M \cdot s \cdot g \cdot Q$$

follows $$v^2 = 2 \cdot s \cdot g \cdot Q$$

or $$s = v^2 / 2 \cdot g \cdot Q.$$

Thereby, v means the velocity in m/sec;

s means the run-out distance in m;

g means the gravitational acceleration in m/s2; and

Q means the coefficient of friction (non-dimensional number in the region of 0.01).

The following table shows some examples of the practice:

| Pull-out speed of the pallet in m/sec | 0.1 | 0.15 | 0.18 | 0.2 | 0.3 |
|---|---|---|---|---|---|
| Run-out distance (calculated) in m | 0.05 | 0.1125 | 0.162 | 0.2 | 0.45 |
| Run-out path minus width of the pallet base panel | 0 | 0.0125 | 0.062 | 0.1 | 0.35 |
| Application | Seldom | Usual | Usual | Usual | Limit |

It can be seen from the above calculations that the length of the run-out path is not dependent of the variable mass, but only of the coefficient of friction of the roller chain and the pull-out speed. In the case of roller chain having the rollers mounted by means of rolling contact bearings, the coefficients of friction are close to each other. In the above table, lower limit values are assumed to demonstrate the worst case.

The top speed of the conveying member is given by the driving speed of the backwardly moving fork lift truck during the removal of a pallet from the shelf channel. Many observations have shown that the speed usually does not exceed 30 cm/sec=18 m/min due to technical reasons.

The basic idea of the invention is based on the consideration, not to provide additional braking means engaging the pallet mass, but to allow the pallet to run out, decelerated only by the inherent friction. For this purpose, a stationary slide member is located in the region of the unloading end of the shelf channel, having a top surface with an active length corresponding to 0.8- to 11.2-times of the mean brakeless run-out distance of the conveying member set in motion by the removal of goods received on the top of the conveying member. In order to release the non-positive frictional coupling between the conveying member and the goods resting on its top surface when the goods are unloaded from the shelf channel, the conveying member is designed such that the non-positive frictional coupling is released in front of the active surface of the slide member. The result is that the entire active length of the slide member can be used for the deceleration of the conveying member and, therewith, the goods placed thereon.

The slide member itself does not need to be designed as to be particularly work consuming. A friction lining would not contribute very much to the deceleration, because only appr. one third of the weight of the front most pallet, i.e. in the borderline case only 1/60 of the total mass received on the conveying member, rests on the slide member. It follows from this that no considerable braking effect is performed by the provision of the slide member. However, at the end of the run-out path, a positive stop member can be provided as an additional measure of safety, which operates only when the speed of the front most pallet has been considerably reduced.

According to a preferred embodiment, the conveyor is provided with a deflection assembly adapted to deviate the movable conveying member and located in the region of the unloading end of the shelf channel in a distance from the unloading end which corresponds at least approximately to the active length of the slide member. The backward offset of this deflection assembly, however, presents the disadvantage that the roller chains are not visible by the driver of the fork lift truck. Thus, the possibility is removed to recognize the beginning and the end of the usable chain run, e.g. by a different color. In order to overcome this disadvantage, a further preferred embodiment of the invention provides position indicator members that are slidably mounted and operated by driving dog members provided on the conveying member. In this way, the position indicator members can be displaced between a rest position and an operating position, in which latter the position indicator members are visible for the driver of the fork lift truck. By means of these preferably colored position indicator members, the beginning and the end of the usable chain run can be recognized from a position at the front end of the shelf channel.

In the following, an embodiment of the invention will be further described, with reference to the accompanying drawings, in which.

In the following, and with reference to FIG. 1a, the general layout of a tunnel stand bearing arrangement shall be further explained. In view of the fact that such tunnel stand bearing arrangements are well known in the art, the following explanations only refer to the characteristics which are essential for the invention, whereby it is assumed that a tunnel stand bearing arrangement is used in which the goods are loaded into the shelf channel and removed from the shelf channel, respectively, at the same end of the channel, in the present example at the left hand side.

Figure 1A:
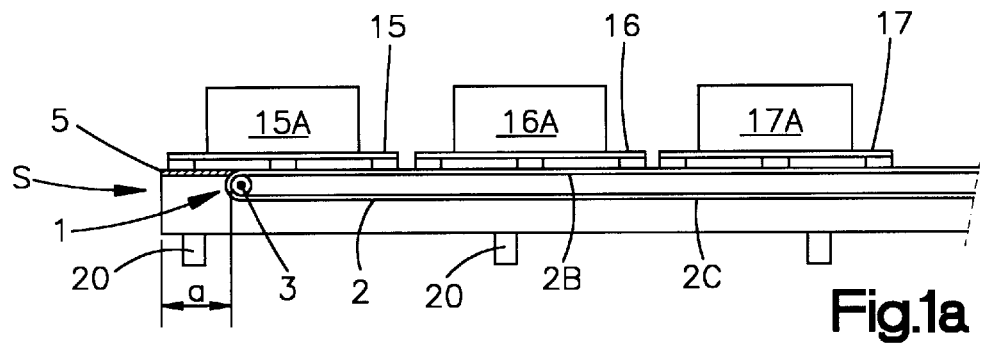
FIG. 1a shows a schematic side view of the end region of an individual shelf channel of a tunnel stand bearing arrangement.

FIG. 1a shows a schematic side view of the end region of an individual shelf channel of the tunnel stand bearing arrangement. There is provided a roller chain assembly serving as the conveying means 2. Thereby, it is understood that each shelf channel comprises a pair of roller chains located in spaced relationship and extending along the shelf channel. Since the conveying means 2 has to receive goods only on its upper side, it is sufficient to design only about one half of the endless traveling conveying means 2 as a roller chain and to interconnect its two free end by e.g. a belt; such a design is lighter in weight and less expensive to manufacture.

To support the conveying means 2, the shelf channels of the tunnel stand bearing arrangement are provided with a cross bar member, designated by reference numeral 20 in FIG. 1a.

In order to deflect the roller chain 2, there is provided a deflection assembly 3 such that the roller chain is divided into an upper run 2B and a lower run 2C. Moreover, there is provided a support rail member 6 which serves to support the upper run 2B of the roller chain 2; the design of the support rail member 6 will be further explained herein after with reference to FIGS. 2 and 3.

In the region of the end of the shelf channel, there is provided a stationary slide member 5 which serves as a run-out zone for the goods 15, 15A, 16, 16A, 17, 17A received on the top of the roller chain 2. As explained herein before, the length of the running-out zone is independent of the total mass of the goods 15, 15A, 16, 16A, 17, 17A stored in the particular shelf channel and received on the top of the roller chain 2, because essentially only the conveying speed of the goods and the roller chain 2, respectively, is to be considered as variable item.

The active length a of the slide member 5 amounts to approximately 0.8- to 1.2-times of the mean brakeless run-out distance of the conveying means 2 set in motion by the removal of goods 15, 15A, 16, 16A, 17, 17A received on the top of the conveying means 2. Thereby, the expression "active length" shall be understood as the length a of the slide member 5 between the end of the conveying means 2 and the leftmost end of the particular shelf channel. Tests performed by the inventor have shown that the active length a of the slide member 5 amounts, in practice, to between 10 and 40 cm. The provision of such a slide member 5 results in the fact that the length of the particular shelf channel available for the storing of goods is longer than the effective conveying path of the conveying means 2.

Figure 1B:
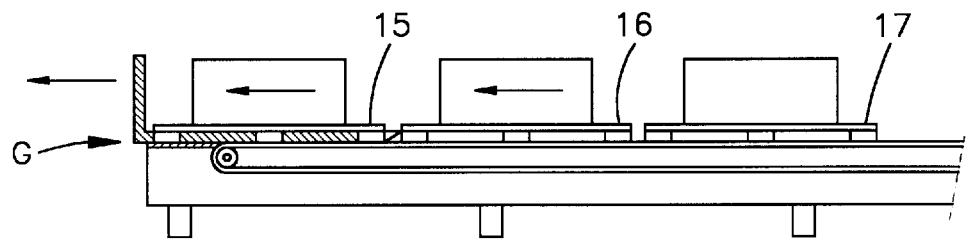
FIG. 1b shows a view corresponding to the one of FIG. 1a, in a first phase of operation during the removal of a pallet.
Figure 1C:
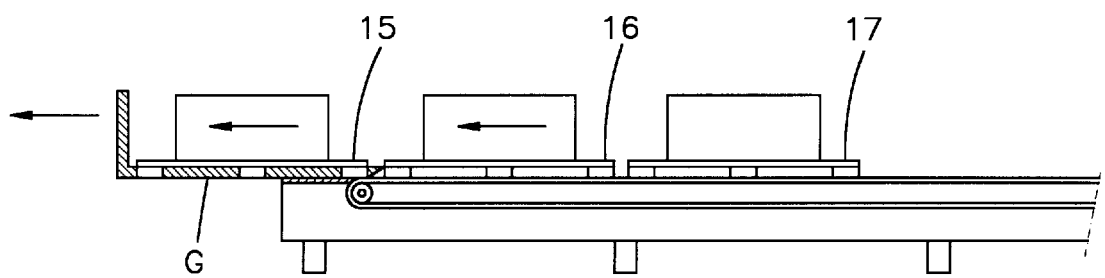
FIG. 1c shows a view corresponding to the one of FIG. 1a, in a second phase of operation during the removal of a pallet.
Figure 1D:
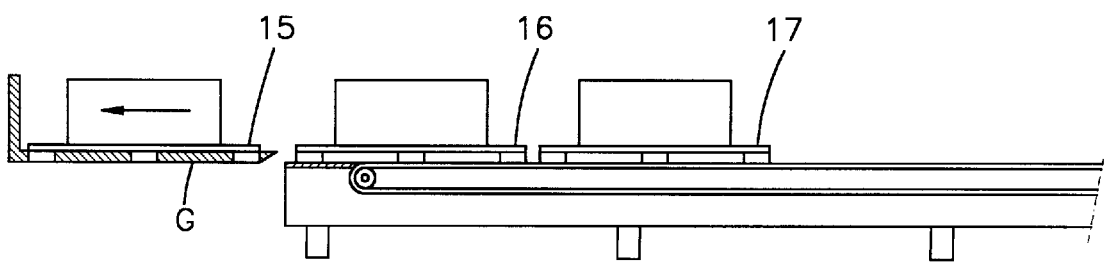
FIG. 1d shows a view corresponding to the one of FIG. 1a, in a third phase of operation during the removal of a pallet.

FIG. 1b shows a schematic side view of the end region of an individual shelf channel of a tunnel stand bearing arrangement in a first phase of operation during the removal of the front most pallet 15. For this purpose, as shown in the drawing, a fork lift truck can be used; for simplicity's sake, only the forks G of the fork lift truck are shown in FIG. 1b to 1d. Preferably, the top surface of the forks of the fork lift truck is provided with a high friction lining or some sort of driving dog means as is well known in the art. In order to remove a pallet 15 from the shelf channel, the forks G are introduced under the front most pallet 15 and lifted to such an extent that the high friction lining or driving dog means provided on the top surface of the forks come into good non-positive or frictional contact with the pallet 15 to be removed, but without lifting the rearmost panel of the pallet 15 off the conveying means 2 and without releasing the frictional contact between the pallet 15 and the conveying means 2, respectively.

Thereafter, the operator of the fork lift truck drives his vehicle backwards and thereby pulls out the front most pallet 15, together with the conveying means 2 and the further pallets 16, 17 . . . resting thereon. As soon as the fork lift truck and, therewith, its forks are moved backwards to such an extent that the rearmost bottom panel of the front most pallet 15 has left the conveying means, as shown in FIG. 1c, the pulling force coupling between fork lift truck and front most pallet 15, respectively, and conveying means 2 is geometrically released, with the result that the pallets 16, 17 . . . still resting on the conveying means are not pulled out any longer, but move towards the end of the shelf channel under the influence of their kinetic energy.

Thereby, the rolling friction acts contrary to the moving total mass, comprising the conveying means 2 and the pallets 16, 17 . . . resting thereon, and decelerates this mass until it comes to a standstill, whereby the front most bottom panel of the pallet 16 remaining on the surface of the conveying means 2 overruns the end of the conveying means 2 and is pushed onto the slide member 5 situated at the end of the conveying means; this situation is shown in FIG. 1d.

The length of the rolling out path is a function of the friction coefficient of the conveying means 2 and the pulling out velocity of the pallets, but is independent from the total mass of the pallets 16, 17 . . . still remaining in the shelf channel. As previously mentioned, the length of the slide member 5 amounts to 10–40 cm in practice; that means that the conveying means 2 can have an initial velocity of up to 0.3 m/s, supposing a friction coefficient of 0.01, without the risk that the front most pallet overruns the end of the shelf channel of the tunnel stand bearing arrangement. In order to be on the very safe side, an additional stop member can be provided at the end of the slide member 5.

The removed pallet 15 is pulled out further by means of the fork lift truck with a constant velocity and driven away. Thereby, the fork lift truck already has moved away from the end of the shelf channel of the tunnel stand bearing arrangement, when the running out process of the pallets 16, 17 . . . remaining in the shelf channel has come to an end.

Figure 2:
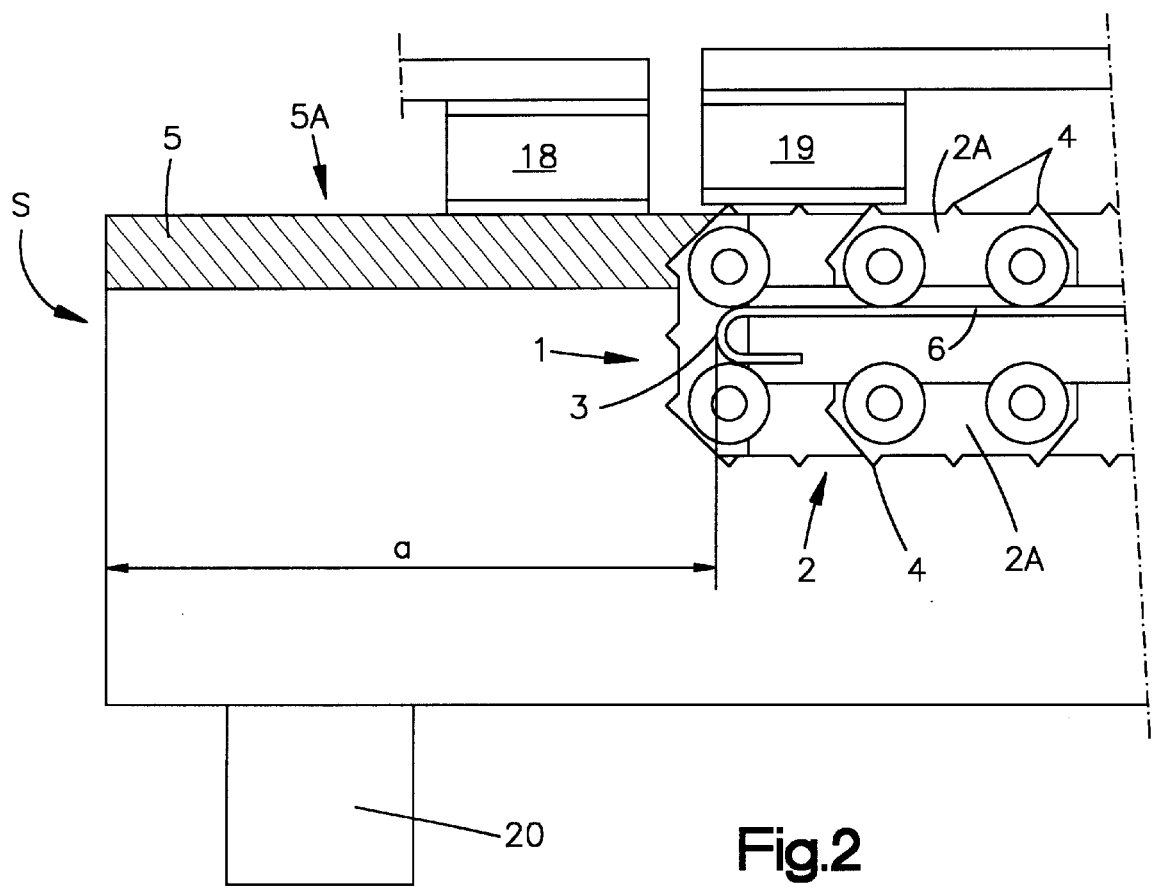
FIG. 2 shows an enlarged, more detailed view of the conveying means in the region of its deflection.

FIG. 2 shows an enlarged, more detailed view of the conveying means 2 in the region of its deflection assembly 3. In this figure, it can be clearly seen that the conveying means 2 comprises a roller chain assembly, whereby the particular chain link members 2A are provided with jagged projections 4 located on their tops. These jagged projections 4 improve the non-positive connection between the roller chain 2 and the pallet received thereon. It should be noted that essentially only the front most bottom panel 19 of a pallet received on the roller chain assembly 2 is shown in FIG. 2, while reference numeral 18 designates the rearmost bottom panel, resting on the slide member 5, of the pallet just being removed from the shelf channel.

In order to favor a reliable running out of the pallets onto the slide member 5, the latter one is preferably located on a slightly lower level than the level of the top surface of the roller chain assembly 2. In the region of the deflection assembly 3, the jagged projections 4 of the particular chain link member 2A release the pallet resting thereon, with the result that the non-positive connection between pallet and roller chain assembly 2 is released.

Figure 3:
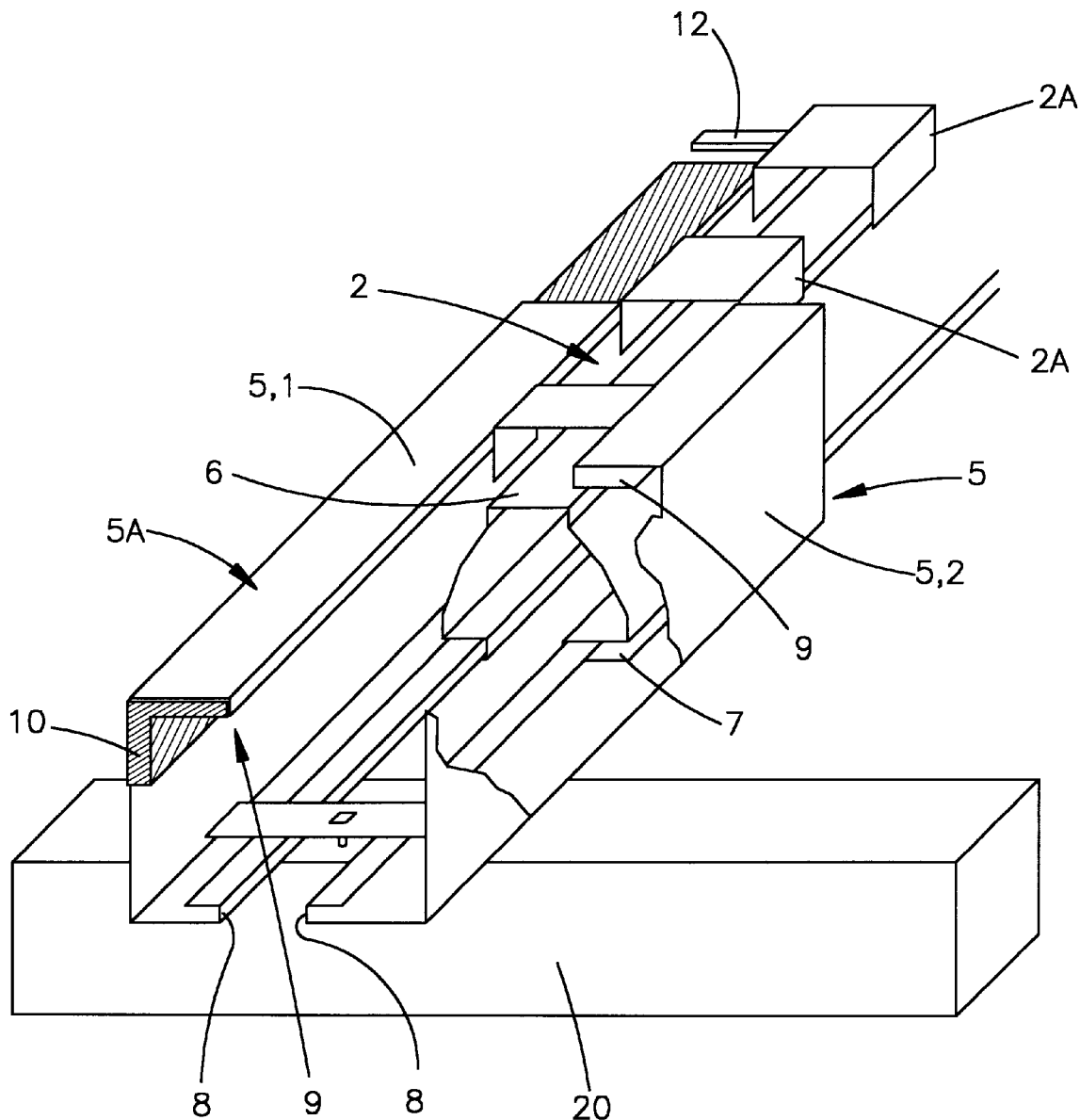
FIG. 3 shows a schematic perspective view of the slide member, together with a portion of the supporting rail.

FIG. 3 shows a schematic perspective view of the slide member 5, together with a portion of the supporting rail 6 serving for guiding and supporting the particular conveying means 2. Essentially, the slide member 5 comprises two generally U-shaped profiled rail members 5.1 and 5.2, which are located in a certain distance to each other such that a longitudinally extending slot is present both at the upper side and at the lower side of that rail member assembly. In the upper regions of the profiled rail members 5.1 and 5.2, hollow chambers 9 are provided which are open at their front ends. These hollow members 9 serve for receiving position indicator members 10, slidably received in that hollow chambers 9, by means of which the actual position of the conveying means 2 can be visualized. It should be noted that in FIG. 3 only the left hand sided hollow chamber 9 is provided with a position indicator member 10.

In order to provide for an operation of the position indicator members 10 under the influence of the conveying means 2, the position indicator members 10 are longer than the active length of the slide member 5. The conveying means 2 is provided with driving dog members 12 adapted to shift the position indicator members 10. As driving dog members 12, for instance permanent magnet members or friction coupling members like brushes can be used, which are adapted to entrain the position indicator members 10 in both directions. The result is that the position indicator members 10 can take either a rest position or an operating position. In the operating position, the particular position indicator member 10 projects out of the hollow chamber 9 through its front sided aperture and is visible through that aperture, respectively, while the particular position indicator member 10 is hidden in the hollow chamber 9 when it is in its rest position. In order to be clearly recognizable, the position indicator members 10 are preferably colored.

Measures are taken that different states of the particular shelf channel can be indicated, as far as its occupation is concerned, by means of the position indicator members 10. For instance, it can be indicated that the first empty chain portion is ready to receive pallets, or it can be indicated that the conveying means 2 is fully occupied. It is understood that also intermediate states can be indicated, for instance if several, let's say two or four position indicator members 10 per shelf channel are provided.

The driving dog members 12, together with the position indicator members 10, can be designed as stop member in order to limit the forwardly directed motion of the conveying means 2.

In order to provide for a reliable and stiff connection having a high bending resistance between the slide member 5 and the support rail member 6, the support rail member 6 is provided with grooves 7 which are adapted to cooperate with strip members 8 provided on the slide members 5. In this way, it is possible to interconnect the two elements 5 and 6 in a very rigid manner between two cross bar members 20 (FIG. 1).

By the provision of the longitudinal slot of the slide member 5, the conveying means 2 can be directed downwardly and deflected at the desired position.

To sum up, it can be said that a tunnel stand bearing arrangement designed according to the present invention ensures a reliable and gentle deceleration of the moving conveying means 2, together with the goods received thereon. Any danger is avoided that the goods in the shelf channel and the front most pallet, respectively, are unwillingly moved out of the shelf channel and overrun the end of the shelf channel, respectively. This result may be achieved due to the fact that the connection where power is transmitted by friction between the conveying means 2 and the pallet 15 is released during the removal of a pallet, but before the pallet is completely removed.

I claim:

1. Tunnel stand bearing arrangement comprising a plurality of shelf channels, each being provided with a circulating conveying means, on which the goods to be stored are received in a frictional manner, characterized in that each shelf channel is provided with a stationary slide member located in its end region where the goods are unloaded, the slide member having an active length corresponding to 0.8- to 1.2-times of the mean brakeless run-out distance of the conveying means set in motion by the removal of goods, whereby the conveyor is designed such that the non-positive frictional coupling between the conveying means and the goods stored thereon is released in front of the active portion of the slide member.

2. A tunnel stand bearing arrangement according to claim 1, characterized in that the active length of the slide member amounts to between 10 and 40 cm, and that the length of each of the shelf channels available for storing goods is greater than the length of the total effective conveying path of the conveying means.

3. A tunnel stand bearing arrangement according to claim 1, whereby the conveyor is provided at least in the region of the unloading end with a deflection assembly for the conveying means, characterized in that the deflection assembly is located in a distance from the unloading end which corresponds at least approximately to the active length of the slide member.

4. A tunnel stand bearing arrangement according to claim 1, characterized in that the conveying means is designed as circulating chain, particularly a supporting roller chain, whereby the upper run of the conveying means is shorter than the length of each of the shelf channels available for storing goods.

5. A tunnel stand bearing arrangement according to claim 1, characterized in that a support rail is provided for guiding and supporting the conveying means, the support rail comprising longitudinal grooves adapted to cooperate with longitudinal strip members provided on the slide member such that an interconnection between the support rail and the slide member is realized which comprises a high bending resistance.

6. A tunnel stand bearing arrangement according to claim 5, characterized in that the slide member comprises at least one hollow chamber which is open at its front end, in which a position indicator indicating the position of the conveying member is slidably received, whereby the position indicator is designed to cooperate with a driving dog located at the conveying means, such that the position indicator is movable between a rest position and an operating position by the particular driving dog, the position indicator being visible when it is in its operating position.

7. A tunnel stand bearing arrangement according to claim 6, characterized in that the position indicator is longer than the active length of the slide member.

8. A tunnel stand bearing arrangement according to claim 6, characterized in that the driving dog together with the position indicator constitutes a stop member for limiting the path of movement of the conveying means in the direction towards the unloading end of the shelf channel.

9. A tunnel stand bearing arrangement according to claim 6, characterized in that the driving dog is constituted by a permanent magnet or a brush, whereby the latter one entrains the position indicator by frictional engagement in both directions.

10. A tunnel stand bearing arrangement according to claim 1, characterized in that the top surface of the slide member is essentially in alignment with the top surface of the conveying means.

* * * * *